United States Patent [19]

Ishida et al.

[11] Patent Number: 5,176,584
[45] Date of Patent: Jan. 5, 1993

[54] SILENT CHAIN

[75] Inventors: Hiroki Ishida, Tokorozawa; Masaru Morimoto, Hanno; Nobuyuki Fujimoto, Hanno; Masao Maruyama, Hanno, all of Japan

[73] Assignee: Tsubakimoto Chain Co., Osaka, Japan

[21] Appl. No.: 788,855

[22] Filed: Nov. 7, 1991

[30] Foreign Application Priority Data

Nov. 8, 1990 [JP] Japan .................. 2-116642
Jul. 31, 1991 [JP] Japan .................. 3-67381

[51] Int. Cl.$^5$ .............................................. F16G 13/04
[52] U.S. Cl. ............................ 474/206; 474/213; 474/214
[58] Field of Search .................... 474/206, 212-217

[56] References Cited

U.S. PATENT DOCUMENTS 1,602,697 10/1926 Morse .................. 474/213
1,743,500 1/1930 Sturtevant .................. 474/214 X Primary Examiner—Thuy M. Bui
Attorney, Agent, or Firm—Flynn, Thiel, Boutell & Tanis; Flynn, Thiel, Boutell & Tanis

[57] ABSTRACT

A silent chain having a series of links, with adjacent links being pivotally joined by transversely-extending connecting pins. Each link is defined by a plurality of link plates disposed in sidewardly adjacent relationship, which link plates define inwardly projecting sprocket teeth adjacent opposite ends thereof. Guide plates are disposed adjacent opposite sides of some of the links and extend between adjacent connecting pins. Plate spring links are sidewardly interposed between adjacent link plates or between a link plate and a sidewardly adjacent guide plate. The spring link plates have a configuration such that no portion thereof extends into the pitch circle of the sprocket which meshes with the chain links.

9 Claims, 2 Drawing Sheets

SILENT CHAIN

FIELD OF THE INVENTION

The present invention relates to an improved silent-type transmission chain.

BACKGROUND OF THE INVENTION

A silent chain, as disclosed in Japanese Patent No. 58-1304 (and corresponding U.S. Pat. No. 4,345,904), is often constructed such that a plurality of link plates are connected on a connecting pin in parallel with each other so as to be rotatable, a guide link is provided at an end portion of the connecting pin, a plate spring link is interposed at an appropriate position between adjacent parallel link plates, and/or a plate spring link is interposed between the guide and link plates.

This plate spring link is constructed like a leaf spring and functions to reduce clearance between the parallel link plates, to prevent a chord vibration of the chain from occurring, and to suppress generation of noises by creating resistance against bending movement of the chain. The plate spring link typically has a configuration as shown in FIG. 3 and is interposed between adjacent link plates or between the link plate and the adjacent guide plate. The typical configuration of this leaf-type spring plate, and its typical position between the plates of the silent chain, is illustrated in detail in aforesaid U.S. Pat. No. 4,345,904.

As shown in FIG. 3, a sprocket tooth T1 rotating in a direction of the arrow meshes with a link plate L1 of one link at its right end surface L', and a sprocket tooth T2 meshes with a link plate L2 of the next link, which link L2 is disposed at a leading side of the link plate L1, and is engaged at a right end surface L".

The link plates L1 and L2 are connected with each other in a longitudinal direction of the chain by a pair of connecting pins P1 and P2 which define a rocker-joint type. A plate spring link S is laid side by side and overlapped with the link plate L1. Link S has an insertion hole H for inserting the connecting pins P1 and P2. The inner diameter of the insertion hole H is designed to maintain play or clearance a with respect to the connecting pins P1 and P2. Both end surfaces S', S' of the plate spring link S are positioned inwardly of meshing surfaces L', L' of the link plate by a clearance b, and this clearance b is larger than the play a. That is, the clearance b is designed so as to maintain a relationship b>a.

Such a relationship defined by a formula b>a is a necessary condition to prevent both end surfaces S', S' of the plate spring link from protruding outwardly beyond the meshing surface L' of the link plate L1, even if the plate spring link S moves within the play a which is provided between the plate spring link S and the connecting pins. As a result, the end surfaces S', S' of the plate spring link can be prevented from interfering with the sprocket tooth T1, and therefore the plate spring link S is prevented from being broken.

Accordingly, in the above conventional structure, the manufacture of the plate spring link S must be carefully controlled for dimensions in order to satisfy the relationship that the dimension c of the plate spring link S with respect to the sprocket pitch circle PC and the dimension d of the link plate L1 correspond to the plate spring link S so as to provide the clearance 2b (i.e. 2b=d−c). Therefore, the stamping step of the plate spring link must be always carefully checked for manufacturing accuracy, and thus it is a troublesome process.

To resolve the above problem encountered in the prior art, the present invention provides a silent chain in which the portion of the plate spring link which projects into the sprocket pitch circle is cut out and removed in order to nullify a condition required against the relationship between the play a of the insertion hole and the clearance b of the plate spring link with respect to a meshing surface of a link plate. The plate spring link has a substantially X-shaped configuration by cutting out a part of the insertion hole for the connecting pins, or has a configuration of a glasses frame.

Accordingly, since a plate spring link in accordance with the present invention does not have an extending portion which extends into the sprocket pitch circle, the plate spring link does not protrude beyond the meshing surface of the link plate. Therefore, the plate spring link does not interfere with a sprocket tooth.

Moreover, in the case that the external configuration of the plate spring link is formed of substantially an X-shaped configuration by providing an opened concave portion at each end of the plate spring link, it is not necessary to carry out a separate stamping step for making an insertion hole for the connecting pin. The gripping recess portion for gripping the connecting pin is formed at the same time as stamping the external configuration. Further, it can be prevented that the plate spring link is removed from the connecting pin. Furthermore, in the case that the plate spring link is formed in the shape of a glasses frame, the plate spring link is prevented from being partly lost even when a crack occurs on the periphery of the insertion hole.

DETAILED DESCRIPTION

Figure 1:
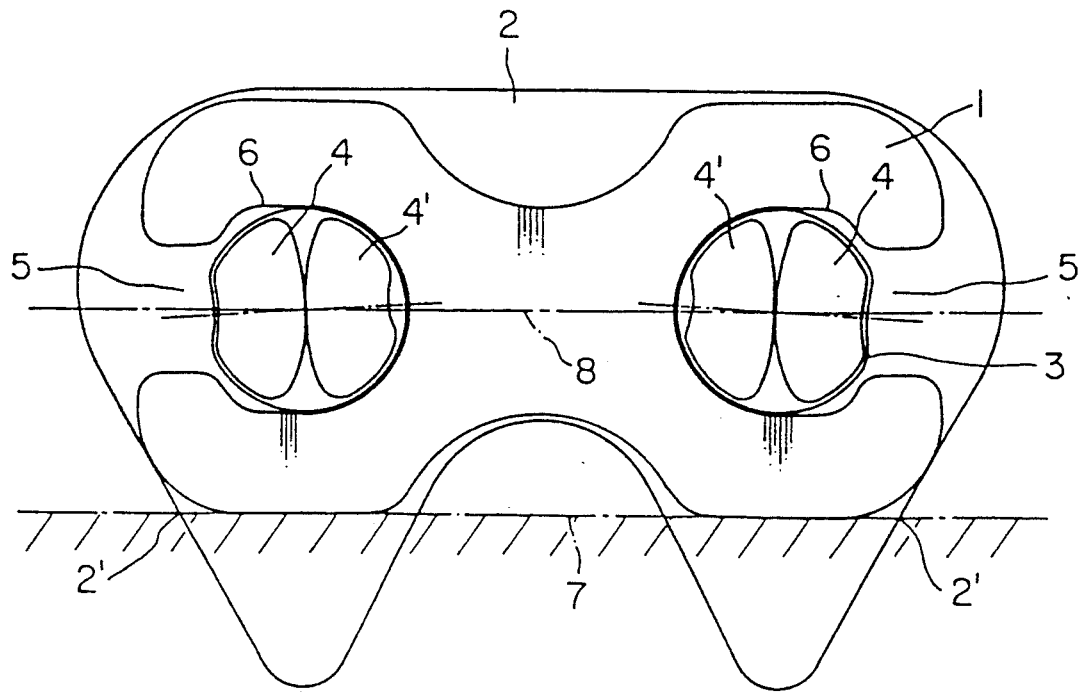
FIG. 1 shows an enlarged front view of an X-shaped plate spring link in accordance with a first embodiment of the present invention.

FIG. 1 shows a first embodiment of the present invention. A plate spring link 1 is formed at each end portion with a concave recess portion or opening 6 for gripping a pair of connecting pins 4, 4' which are inserted into a pin insertion hole 3 formed in a conventional link plate 2. The link 1 has a slot-like opening 5 which opens outwardly from opening 6 through the end of the link. The link 1 thus has an X-shaped configuration which is symmetrical in both an up-and-down direction and a right-and-left direction, and has no extending portion which projects into the pitch circle 7 (the hatched portion in FIG. 1) of the sprocket.

Accordingly, since the plate spring link 1 has no structural portion which overlaps or projects beyond the surface 2' of the link plate 2 which meshes with a sprocket tooth, the plate spring link 1 does not interfere with the sprocket tooth even if the plate spring link 1 moves against the connecting pins 4, 4' so as to eliminate the play therebetween.

Figure 2:
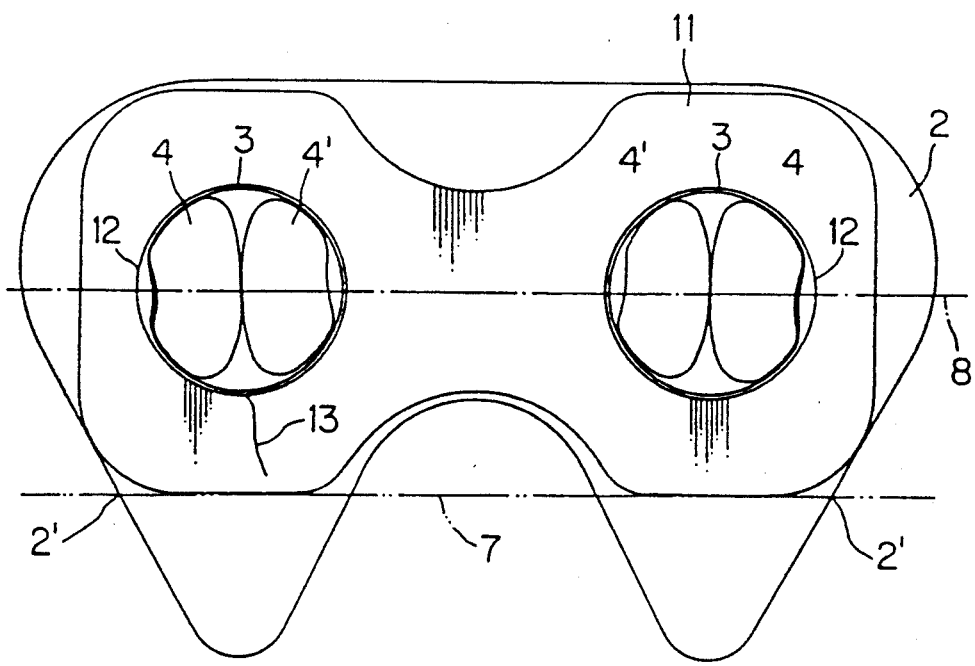
FIG. 2 shows an enlarged front view of a plate spring link of a frame-like shape of glasses in accordance with a second embodiment of the present invention.
Figure 3:
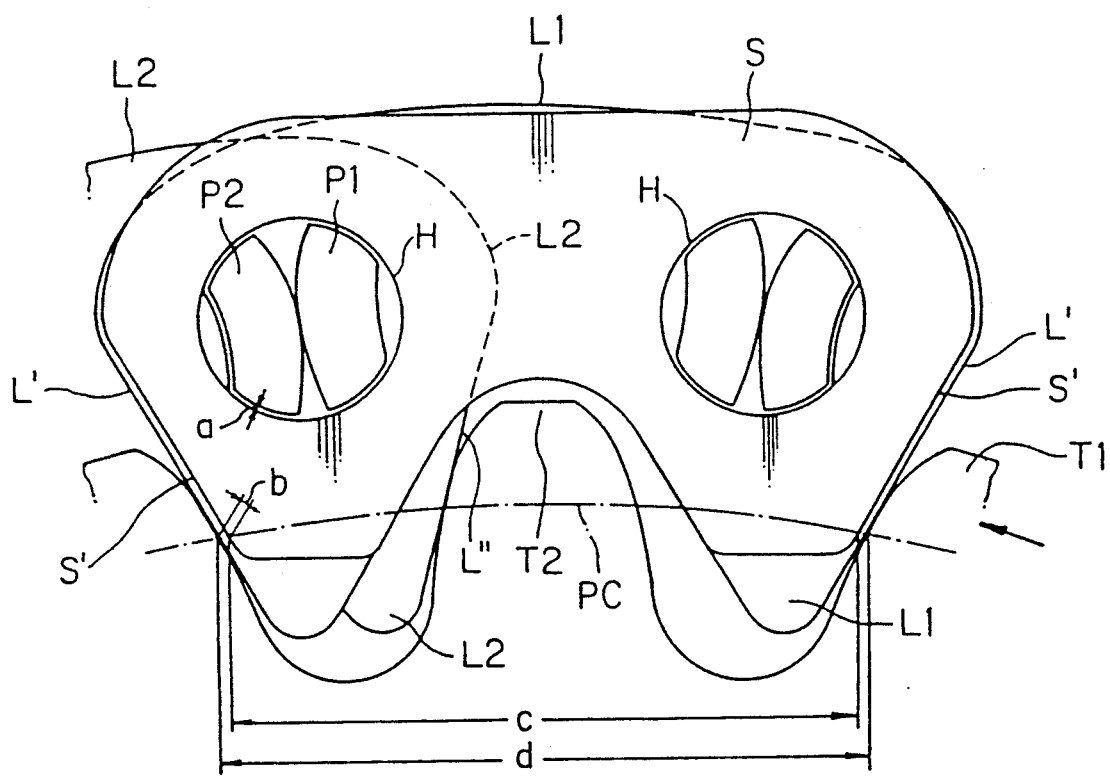
FIG. 3 is a view illustrating an installation of a link plate and a plate spring link according to the prior art.

FIG. 2 shows a second embodiment of the present invention. A plate spring link 11 has an external configuration similar to the shape of a glasses frame (i.e., similar to a figure "8"). Link 11 has a pair of pin insertion holes 12, 12 and is formed symmetrical in both an up-and-down direction and a right-and-left direction. Other features of link 11 are the same as those shown in FIG. 1. Thus, plate spring link 11 does not project into the pitch circle 7 and hence does not interfere with the sprocket tooth.

In accordance with the present invention, the plate spring link 1 or 11 has no extending portion which extends into the pitch circle of the sprocket. Therefore, it is not necessary to impose special regulations for controlling the dimension of the external configuration of the plate spring link in order to avoid an interference with a sprocket tooth when meshing with the sprocket tooth as is encountered in the prior art. Thus, it becomes easy to control accuracy in manufacturing the plate spring link 1 or 11, and in the case where a slot or mouth is provided for communication with the opening which receives the connecting pins, the manufacturing of this slot and opening can be done at the same time as stamping the external configuration of the plate spring link. Thus, manufacturing is shortened compared with the conventional stamping method in which the stamping step for making the external configuration of the plate spring link and the stamping step for making the insertion holes are separately or independently carried out, which results in improved overall manufacturing efficiency. On the other hand, in the case where the insertion holes for connecting pins are provided, even if a crack is caused on the periphery of the insertion hole, it can be prevented that the plate spring link is partially lost due to the crack. Furthermore, it is also prevented that a broken piece of the plate spring link is stuck when the plate spring link is meshed with the sprocket tooth, and thus it becomes possible to carry out smooth meshing transmission. Still further, compared with the conventional plate spring link, the improved plate spring link is light because the extending portion which extends into the sprocket pitch circle is removed, which results in attaining the purpose of weight reduction of the silent chain. Moreover, in the case where the configuration of the plate spring link is formed in the X-shape or the glasses frame shape which are symmetrical in both the up-and-down direction and the right-and-left direction, the plate spring link can be installed by turning the link upside down or inside out. Therefore, there is obtained various superior effects in that the flexibility of the installation work of the plate spring link is expanded and/or the installation work becomes easy.

It will be appreciated that the spring plates 1 and 11 of the invention function as a typical leaf spring, and have a typical configuration several of which are shown in U.S. Pat. No. 4,345,904, so as to create a sideward spring bias between sidewardly adjacent link plates or link and guide plates.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A silent chain which has a plate spring link interposed between link plates which are disposed adjacent with each other in an axial direction of a connecting pin and/or between a link plate and a guide link, and said plate spring link has no extending portion which extends into a pitch circle of a sprocket which meshes with the plate spring link.

2. A silent chain according to claim 1, in which said plate spring link is formed of an X-shaped external configuration which has at its both ends a pair of opened concave portions for gripping the connecting pin.

3. A silent chain according to claim 1, in which said plate spring link has a pair of insertion holes for inserting the connecting pin.

4. A silent chain according to claim 1, in which said plate spring link has an external configuration which is symmetric in both an up-and-down direction and a right-and-left direction.

5. A silent chain adapted to be engaged with a tooth sprocket, said chain including a plurality of links which are serially pivotally connected throughout the endless length of the chain, each link being defined by a plurality of meshing link plates disposed in sidewardly aligned relationship with at least some of the link plates being in sidewardly spaced relationship, the link plates of adjacent links having end portions which sidewardly overlap, the meshing link plates being substantially identical and including a pair of inwardly projecting teeth adjacent opposite ends thereof which are spaced apart by an intermediate recess adapted to receive a sprocket tooth, a connecting pin arrangement projecting through transversely aligned openings formed in the overlapping end portions of adjacent link plates for pivotally connecting adjacent links together, a pair of guide plates associated with and defining opposite sides of some of said links and disposed on opposite sides of the respective plurality of link plates, said connecting pin arrangement being coupled to the guide plates, and a spring plate link positioned between a sidewardly adjacent pair of said plates for exerting a sideward spring biasing force thereon, said spring plate link having openings through opposite end portions thereof for respectively accommodating therein the adjacent connecting pin arrangements, the improvement wherein said spring plate link has an exterior edge surface profile such that no portion of the plate spring link extends into the pitch circle of the sprocket which meshes with the chain.

6. A silent chain according to claim 5, in which the plate spring link has a generally X-shaped external configuration defined by end portions joined by a center portion which is of reduced width, each end portion having an opening therethrough for accommodating the respective connecting pin arrangement, said opening communicating with a reduced-width slot-like mouth which opens outwardly through the respective end portion for communication with the exterior edge surface of the spring plate link.

7. A silent chain according to claim 6, wherein the slot-like mouths as associated with opposite end portions of the spring plate link are generally aligned with one another but open outwardly in opposite directions away from one another.

8. A silent chain according to claim 5, wherein the plate spring link has a configuration which resembles a figure "8".

9. A silent chain according to claim 5, in which the plate spring link has an external configuration which is substantially symmetrical in an up-and-down direction and a right-and-left direction.

* * * * *